(12) United States Patent
Guazzo et al.

(10) Patent No.: US 8,544,315 B2
(45) Date of Patent: Oct. 1, 2013

(54) AT REST VACUUM STATE FOR VACUUM DECAY LEAK TESTING METHOD AND SYSTEM

(76) Inventors: Dana Guazzo, Bridgewater, NJ (US); Heinz Wolf, Hackettstown, NJ (US)

( * ) Notice: Subject to any disclaimer, the term of this patent is extended or adjusted under 35 U.S.C. 154(b) by 264 days.

(21) Appl. No.: 12/950,757

(22) Filed: Nov. 19, 2010

(65) Prior Publication Data
US 2011/0174060 A1   Jul. 21, 2011

Related U.S. Application Data

(66) Substitute for application No. 61/263,004, filed on Nov. 20, 2009.

(51) Int. Cl.
*G01M 3/20* (2006.01)

(52) U.S. Cl.
USPC .......................................... 73/40.7

(58) Field of Classification Search
USPC .......................................... 73/40.7
See application file for complete search history.

(56) References Cited

U.S. PATENT DOCUMENTS

| | | | |
|---|---|---|---|
| 2,784,373 A * | 3/1957 | Lawrance et al. ............. | 324/461 |
| 3,487,677 A | 1/1970 | Molitor | |
| 3,667,281 A | 6/1972 | Pfeifer | |
| 3,762,212 A | 10/1973 | Morley et al. | |
| 4,172,477 A | 10/1979 | Reich | |
| 4,320,653 A | 3/1982 | Bernhardt | |
| 4,409,817 A | 10/1983 | Edwards, Jr. | |
| 4,426,876 A | 1/1984 | Kakumoto | |
| 4,774,830 A | 10/1988 | Hulsman | |
| 4,831,870 A | 5/1989 | Smith | |
| 4,934,180 A | 6/1990 | Hulsman | |
| 5,029,463 A | 7/1991 | Schvester et al. | |
| 5,042,291 A | 8/1991 | Lehmann | |
| 5,111,684 A * | 5/1992 | Stauffer et al. ................ | 73/49.3 |
| 5,226,316 A | 7/1993 | Mally et al. | |
| 5,261,379 A | 11/1993 | Lipinski et al. | |
| 5,513,516 A | 5/1996 | Stauffer | |
| 5,907,093 A | 5/1999 | Lehmann | |
| 5,939,619 A | 8/1999 | Achter et al. | |
| 6,050,133 A | 4/2000 | Achter et al. | |
| 6,082,184 A | 7/2000 | Lehmann | |
| 6,167,751 B1 | 1/2001 | Fraim et al. | |
| 6,202,477 B1 | 3/2001 | Lehmann | |

(Continued)

FOREIGN PATENT DOCUMENTS

| | | |
|---|---|---|
| DE | 3340353 A1 | 5/1985 |
| GB | 998908 | 7/1965 |

(Continued)

*Primary Examiner* — Hezron E Williams
*Assistant Examiner* — Mark A. Shabman

(57) ABSTRACT

A method and apparatus for leak testing of liquid and non-liquid filled rigid and semi-rigid nonporous containers wherein a container is enclosed in a conforming test chamber and subjected to vacuum while the pressure within the chamber is monitored by an absolute pressure transducer, alone or in combination with a second differential transducer, to determine if leaks are present in the container and wherein the test apparatus or system remains under low pressure or vacuum conditions while leak tests are not actively in progress such that the system is maintained at an at-rest low vacuum condition to minimize pressure sensor drift and to eliminate build-up of vapors or gases within the apparatus or test system between tests that may hinder the speed and sensitivity of the leak tests.

18 Claims, 5 Drawing Sheets

(56) References Cited

U.S. PATENT DOCUMENTS

| | | |
|---|---|---|
| 6,305,215 B2 | 10/2001 | Lehmann |
| 6,345,527 B1 | 2/2002 | Lehmann |
| 6,368,851 B1 | 4/2002 | Baumann et al. |
| 6,439,032 B1 | 8/2002 | Lehmann |
| 6,439,033 B1 | 8/2002 | Lehmann |
| 6,446,493 B1 | 9/2002 | Lehmann |
| 6,513,366 B1 | 2/2003 | Stauffer |
| 6,557,395 B2 | 5/2003 | Lehmann |
| 6,575,016 B2 | 6/2003 | Lehmann |
| 6,662,634 B2 | 12/2003 | Lehmann |
| 6,687,622 B2 | 2/2004 | Parker |
| 6,804,873 B2 | 10/2004 | Lehmann et al. |
| 6,829,936 B2 | 12/2004 | Lehmann |
| 6,877,356 B2 | 4/2005 | Lehmann |
| 7,000,456 B2 | 2/2006 | Lehmann |
| 7,013,712 B2 | 3/2006 | Lehmann |
| 7,260,981 B2 | 8/2007 | Lehmann |
| 7,313,944 B2 | 1/2008 | Lehmann |
| 7,380,440 B2 | 6/2008 | Lehmann |
| 7,454,957 B2 | 11/2008 | Lehmann |
| 7,584,650 B2 | 9/2009 | Lehmann |
| 7,665,346 B1 | 2/2010 | Stauffer et al. |
| 7,752,891 B2 | 7/2010 | Lehmann |
| 2008/0276693 A1 | 11/2008 | Lehmann |
| 2009/0025457 A1 | 1/2009 | Lehmann |
| 2010/0251805 A1 | 10/2010 | Lehmann |

FOREIGN PATENT DOCUMENTS

| | | |
|---|---|---|
| GB | 1083475 | 9/1967 |
| GB | 2222687 | 3/1990 |
| JP | 06-258175 | 9/1994 |
| WO | 9614561 | 5/1996 |
| WO | WO 2008012611 A2 * | 1/2008 |
| WO | 2011063227 | 5/2011 |

* cited by examiner

AT REST VACUUM STATE FOR VACUUM DECAY LEAK TESTING METHOD AND SYSTEM

BACKGROUND OF THE INVENTION

1. Field of the Invention

The present invention is directed to the field of package/container vacuum decay leak detection and more particularly to the testing of containers filled with either dry product or liquid product such as non-porous vials, ampoules, injection cartridges, ophthalmic product packages, syringes, pouches, blister packages and other packages containing critical medicinal and/or chemical products using a method of measuring vacuum decay within a test chamber in which a container being tested is sealed and wherein as a vacuum is being pulled within the test chamber the pressure levels are continuously monitored using an absolute pressure transducer, or both an absolute pressure transducer and a differential pressure transducer, such that pressure conditions within the test chamber over a period of time are used to indicate whether or not there is a leak in a container being tested. More specifically, the invention is directed to improvements maintaining an at rest vacuum condition in the testing system prior to tests being conducted.

2. Brief Description of the Related Art

There have been many innovation made with respect to the field of pressure testing of containers, packages and container and package seals. In the area of dry content package or container testing, the packages or containers are placed into a test cavity and subject to a change in surrounding pressure. In the field of vacuum package testing, a reduced pressure is established at least along an isolated portion of a package or package seal to determine if there are leaks in the packaging which are detected by monitoring the surrounding pressure to determine if any increase in pressure is detected that will reflect a leak in a seal or in a wall of the package or container under test. In some such tests, diaphragms or other covering devices may be used to seal any porous portion of a package under test or to prevent movement or destruction of a portion of the package or container under test. Some examples of such testing systems and methods are disclosed in U.S. Pat. No. 6,050,133 to Achter el al, U.S. Pat. No. 6,513,366 to Stauffer, U.S. Pat. No. 5,513,516 to Stauffer, U.S. Pat. No. 5,199,296 to Lehmann, U.S. Pat. No. 5,239,859 to Lehmann, U.S. Pat. No. 5,513,516 to Lehmann and U.S. Pat. No. 5,575,265 to Lehmann.

When testing packages and containers which include any liquid, care must be taken to account for vaporization of liquid from within a container which may give rise to false pressure readings at low vacuum pressures, During testing, the vaporizing liquid can increase the pressure in the test chamber such that drops in head space pressure caused by gas leakage cannot be accurately detected. To overcome this, vacuum testing procedures have been developed to account for the vaporization of liquids in containers under test. In some procedures, vacuum levels are drop to a level to vaporize the liquid content of a container after which the withdrawn vapor is effectively removed by freezing of the vapor. Some examples include U.S. Pat. No. 4,320,653 to Bernhardt and U.S. Pat. No. 4,409,817 to Edwards, Jr.

In U.S. Pat. No. 2,784,373 to Lawrance et al, a method and device for testing for leaks in containers that may contain a liquid are disclosed wherein a test chamber in which the container is placed is evacuated to pressures well below the vapor pressure of the liquid until a predetermined vacuum pressure is achieved, afterwhich, the test chamber is isolated from the source of vacuum and a pressure differential test is conduct between a start time and an ending time to determine any increases in pressure that may be caused by vaporized gases passing through small holes in the container, and thus provide an indication that the container has a leak. Other examples of testing systems that operate below the vaporization pressure of a liquid are disclosed in U.S. Pat. No. 4,426,876 to Kakumoto and a series of US patents to Lehmann, including U.S. Pat. Nos. 5,907,093, 6,082,184, 6,202,477, and 6,305,215.

SUMMARY OF THE INVENTION

The present invention is directed to a method and testing apparatus for detecting even sub-visible leaks in non-porous containers including, but not limited to, chemical and/or medicinal containing vials, pouches, blister packs, ampoules, syringes, injection cartridges and ophthalmic packages. In the present invention the terms container, container closure system, product package system and package are used synonymously. In the method of the invention, a partially or completely filled container is placed within a leak-tight and sealed test chamber which is cooperatively configured to minimize air space between the container being tested and the walls defining the test chamber. After the container is placed within the test chamber and the chamber sealed, a vacuum is pulled within the system plus the chamber by a vacuum pump, with the vacuum level being monitored through a series of sequential test periods using both an absolute pressure transducer alone or an absolute pressure transducer and a differential pressure transducer. The initial or first test period is to determine if there are any grossly large failures or leaks in the container so as to abort the test quickly to limit possible contamination of the test equipment. The second period is to determine if there are large leaks so as to again abort the test if necessary and must be long enough to eliminate humidity in the test chamber and any moisture on the test container or chamber surfaces that would otherwise mask pressure rise from a true leak. The third period is a test period, measured in seconds, after which the pressure may be sensed with an absolute pressure transducer, or in the preferred embodiment, is sensed with a differential pressure transducer to detect even minute sub-visible leaks in the container.

In accordance with the test procedures, if the pressure detected within the test chamber fails to fall to a first predetermined pressure, within the first time period, as measured in seconds, the test is aborted as such a result indicates the grossly large leak. If, however, the pressure drops to or below the first predetermined pressure within the first time period, the test continues for the second period of time, as measured in seconds, with the vacuum pump operating. If, after the second period of time, the pressure within the testing chamber has not fallen to a second predetermined vacuum pressure the test is aborted, as such a result reflects an existence of a relatively large leak. If, however, the pressure is detected as being lowered to the second predetermined vacuum pressure by the end of the second period of time, a valve closes a vacuum line between the test system and the vacuum pump and a very short equalization time is allowed to pass, as measured in a fraction of a second, in order to isolate a reference side of the differential transducer from the test chamber. Thereafter, the pressure in the testing chamber is monitored by the differential pressure transducer over a final test period. In the preferred embodiment, during the elapsed time a differential transducer monitors any loss of vacuum, or, if an absolute transducer is used, an increase in absolute pressure within the test chamber, with such a loss of vacuum indicating an increase in pressure indicative of a very smaller leak in the container. During this final test period, when both an absolute pressure transducer and a differential pressure transducer are used, the absolute pressure transducer continues to monitor pressures within the test chamber. The test chamber vacuum loss, or pressure rise, may result from package headspace gas leakage, and/or vaporization of the package's liquid contents when vacuum pressure is below the vapor pressure of at least one liquid within the container being tested. At the completion of each test cycle, a valve closes, isolating the test system with pressure transducers from the test chamber, and a high vacuum is established within the test system. This at-rest vacuum state remains until a subsequent test cycle is initiated, at which point the test system is automatically vented to the atmosphere prior to the test cycle sequence. At-rest vacuum minimizes leak test pressure reading fluctuations caused by gases or vapors trapped in the test system and differential pressure transducer drift that may occur when a transducer is not activated for prolonged periods.

The invention is also directed to an apparatus for testing ampoules, vials, pouches, blister packages, injection cartridges, ophthalmic product packages, syringes, and other nonporous rigid or semi-rigid packages which includes a base tooling having an open top test chamber formed therein of a size to closely and cooperatively retain the test container. The test chamber communicates through a vacuum port with a vacuum conduit that is connected to a vacuum pump. If the container involves a flexible wall or surface, such as a blister package or pouch, the test chamber may include a flexible surface that will allow conformance to the package's flexible surface to thus minimize dead space in the test chamber as well as restrict package wall or surface movement during a test cycle. The tooling may also include multiple cavities, for example, ten, to accommodate the simultaneous testing of multiple packages. The test chamber tooling may also be designed with a disposable insert to separate the test container from the test chamber cavity walls. This insert is intended to safely capture leaking liquid following a "failed" test thus allowing easy disposal of the defective container and minimizing tooling or equipment contamination risks.

In addition to the foregoing, when testing a liquid-filled or partially filled package, the controller of the invention also controls a flushing of the test chamber following a "failed" test to ensure the test chamber is not contaminated and is free of any liquid or vapor that could cause changes in pressure through vaporization of the liquid in a subsequent test cycle. A special hydrophobic filter may be placed between the test chamber and the vacuum chamber and transducers to prevent any contamination of the test instruments.

As previously described, in the preferred embodiment, the invention uses both an absolute pressure transducer and a differential pressure transducer to continuously monitor pressure conditions within a test chamber over several periods of time in order to indicate passage or failure of a container being tested with respect to any leaks. In this respect, the absolute pressure transducer is communicated with the vacuum conduit so as to determine when the various predetermined target vacuum levels are reached within the test chamber. If the final predetermined absolute pressure is achieved within one or more initial predetermined period of times as discussed above, as measured in seconds, the test is allowed to continue and a controller connected to the absolute pressure and differential transducers causes a first valve to close communication of the test chamber with the vacuum pump. If a the final predetermined absolute pressure is not achieved prior to the end of the initial period(s) of time, as previously noted, the test is terminated as such a condition reflects a leak in the container. For packages completely or partially filled with liquid, the final predetermined absolute pressure must be substantially below the vaporization pressure of at least one liquid product within the container. For packages containing dry product the final predetermined absolute pressure may vary from near absolute vacuum levels to pressures substantially greater than absolute vacuum levels.

If the test continues in the preferred embodiment, the differential pressure transducer, which is also in communication with the vacuum conduit and the controller, continues to monitor the pressure within the test chamber for a final test period, as measured in seconds. If an increase in pressure is detected during this third period of time, such change indicates a leak in the test sample.

As noted above, the method of the present invention may be conducted using an absolute transducer alone, or both an absolute pressure transducer and a differential pressure transducer. Vacuum decay leak testing in accordance with the invention involves first, the establishment of vacuum conditions within the test chamber connected to the test system; second, isolation of the test system and test chamber from the vacuum source; and third, monitoring the rise in pressure resulting from package leakage within the test chamber and test system by use of the pressure transducer or transducers. In previous testing systems, following test completion, the test system and test chamber are fully vented to the atmosphere until the next test package is loaded into the test chamber and the test cycle begins again. In the present invention, following test completion, the test chamber and test system are both fully vented to the atmosphere for a predetermined brief period of time ranging from less than a second to a few seconds in length. Then a valve closes, isolating the test system from the test chamber, while a second valve opens between the test system and the vacuum source allowing the test system to achieve an at-rest vacuum or low pressure state. The test system remains at this low pressure state until the test chamber, still vented to the atmosphere, can be loaded with the next test package and a new test cycle can begin.

The present invention also includes a second alternative at-rest vacuum approach. In this second approach, following leak test completion, a valve separating the test chamber from the test system closes, allowing the test system to remain under constant low pressure conditions, while the test chamber alone is fully vented to the atmosphere by means of a second valve. In this way, the test system pressure rises to no more than a few hundred mbar only at the beginning of the next test cycle, when the valve separating the test chamber loaded with the test package opens, drawing the gas within the chamber into the test system. In this case, the pressure within the test system briefly rises but never approaches atmospheric pressure levels even between leak tests. The degree to which the pressure rises at the beginning of the test cycle can provide further indication of leakage, with a pressure rise exceeding a predetermined limit indicative of a grossly leaking test package.

It is a primary object of the present invention to provide a method and system for maintaining a vacuum decay leak test chamber under stable at-rest vacuum conditions such that the results of a test are not influenced by pressure transducer drift that may occur when such transducers are not activated for prolonged periods, and such that test results are not affected by build-up of vapors or gases entrapped within the test system and that may be mistaken for small leaks.

It is a another object of the present invention to provide a method and apparatus for testing packages and containers, including filled medical and other type syringes, ampoules, cartridges, injection devices, pouches, blister packages, or ophthalmic product packages, for leaks wherein the tests are conducted substantially at absolute vacuum conditions or at conditions substantially greater than absolute vacuum, such that the results of the test are not affected by climatic conditions, barometric pressure changes, humidity, ambient temperatures or pressures including pressure differences at various geographic locations due to altitude variations.

It is a further object of the invention to provide a method and system for vacuum decay leak testing that achieves greater leak detection sensitivity than previously possible.

It is also an object of the invention to provide test chambers for testing integrity of nonporous rigid or semi-rigid packages or containers. These packages or containers include, for example, injection devices such as those used for emergency dosing (for example, Epinephrine). Other examples include vials or bottles, ampoules, pouches, blister packages, and ophthalmic product packages such as dropper tip bottles. In all cases, the test method and testing chambers are designed to detect leaks in the components themselves or between components at seal junctures.

It is yet another object of the invention to provide a test method and equipment for testing liquid and non-liquid filled containers wherein the equipment includes protective filters and optional test chamber disposable inserts to prevent contamination of the testing equipment in the event of a large failure in a test sample and wherein the method ensures the flushing of any contamination gas and liquid from the testing chamber following a test that reflects a leak in the test sample before any subsequent tests are conducted.

It is another object of the invention to provide a sequencing method for test for leaks in liquid-filled or dry-filled containers, including syringes, tubes, vials, sealed packages and the like, wherein the tests are aborted quickly in the event of larger leaks or failures that prevent predetermined pressure conditions from being achieved over at least one or a plurality of periods of time before using a differential pressure transducer for determining increase in pressure due to smaller leaks after the final predetermined vacuum pressure is achieved in a test chamber. It is also an object of this invention that one sequencing method approach intended to abort leak tests quickly involves first isolating the test system from the vacuum source, keeping the test system at the at-rest vacuum state, then opening the evacuated test system to the test chamber containing the test package. If the pressure in the test system open to the test chamber exceeds a predetermined limit as measured by the absolute transducer, the test is aborted as this pressure is indicative of a grossly leaking package. If the pressure in the test system opened to the test chamber conforms to the predetermined limit, the vacuum source is then opened to the test system connected to test chamber and the test is allowed to proceed.

It is another object of the present invention to minimize or eliminate environmental effects of temperature, humidity and altitude on test results, thus eliminating calculations designed to adjust for such effects.

It is another object of the invention to shorten the time to reach test vacuum conditions by maintaining lower pressure conditions within the test system at the start of a leak test by isolating the testing system from a vented test chamber.

BRIEF DESCRIPTION OF THE DRAWING

A better understanding of the invention will be had with reference to the accompanying drawings wherein.

DESCRIPTION OF THE PREFERRED EMBODIMENT

Figure 1:
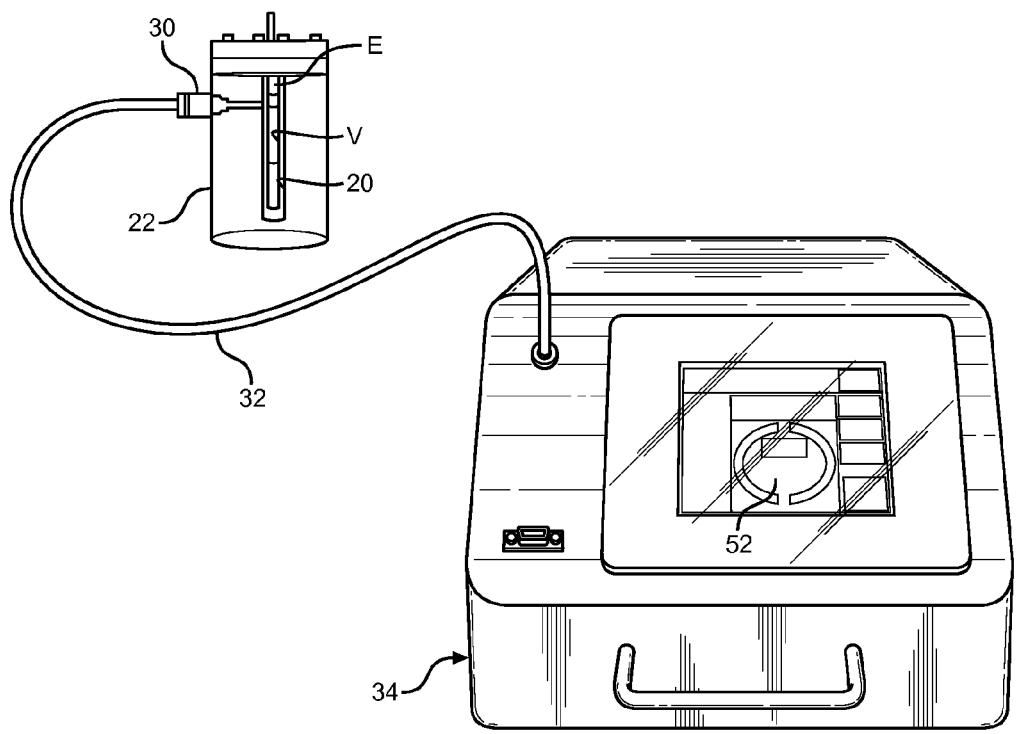
FIG. 1 is an illustrational view, partially in cross section of one form of leak testing apparatus of the invention.
Figure 2:
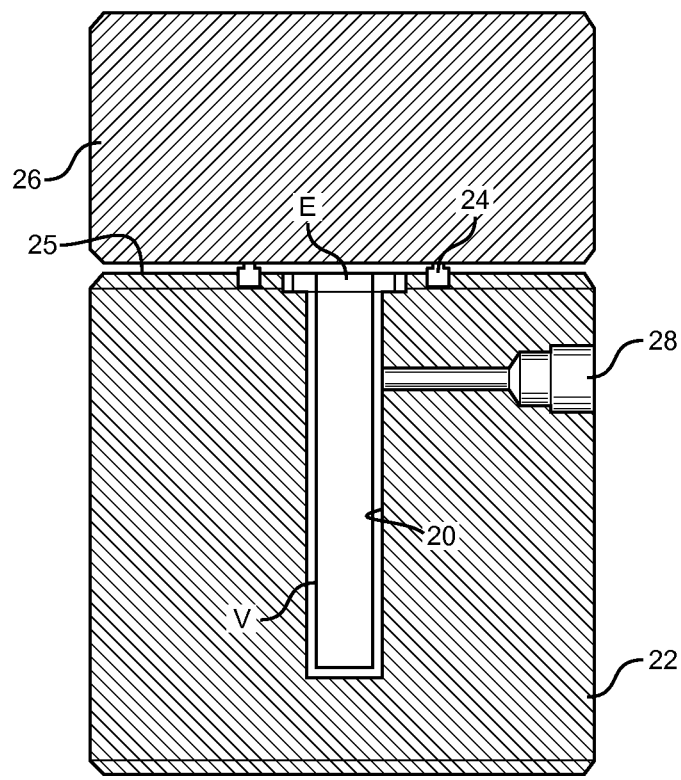
FIG. 2 is a cross sectional view of one embodiment of test chamber for use, by way of example, with the teachings of the present invention.

With reference to FIGS. 1 and 2 of the drawings, the method and testing equipment of the invention will be described in detail. Although the method of the invention may be used to test for leaks in a variety of product packaging, containers, vials, and the like, one preferred testing chamber for leak testing of glass vials "V" sealed with elastomeric closures "E". Only a simple basic testing system is described as the method of the invention may be used to increase the operating efficiencies of many know testing systems. Such a basic testing system may include an open testing chamber 20 formed in a base tooling 22 formed of metal or a heavy duty plastic. A seal in the form of an O-ring 24 is provided on a top 25 of the bottom tooling so that when an upper tooling 26 is secured by force or by appropriate fasteners to the lower tooling, a test chamber 20 will be sealed to the ambient surroundings except by way of a suction port 28 formed through a side wall of the bottom tooling. A fitting 30 connected to an outer end of a suction conduit 32 is secured within the suction port 28 and extends to a controller 34 in which a test system 33 is housed. As noted, a variety of test chambers may be used in accordance with the methods of the present invention.

As shown in FIG. 2, the test chamber 20 is configured to be compatible with the body of the vial or other container or package so as to reduce the air space between the vial "V" and the chamber to as little as possible to thereby minimize the volume of air that is subjected to a vacuum during a test but which provides sufficient clearance to allow placement and removal of the vial.

Figure 3:
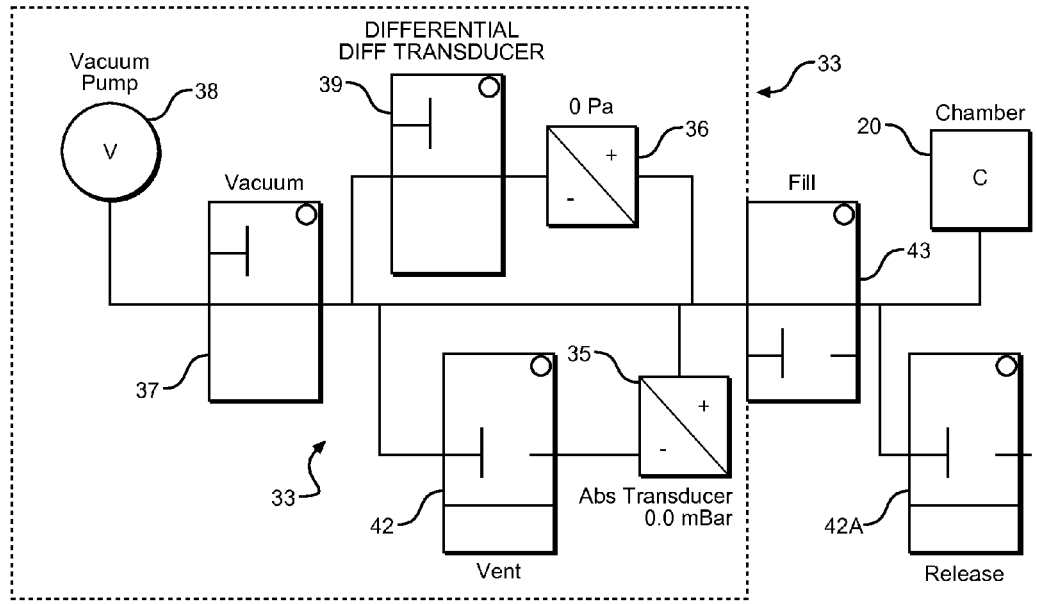
FIG. 3 is a diagram of a preferred embodiment of testing system or circuit of the present invention showing an isolation valve in an open position communicating the testing system with a test chamber.
Figure 4:
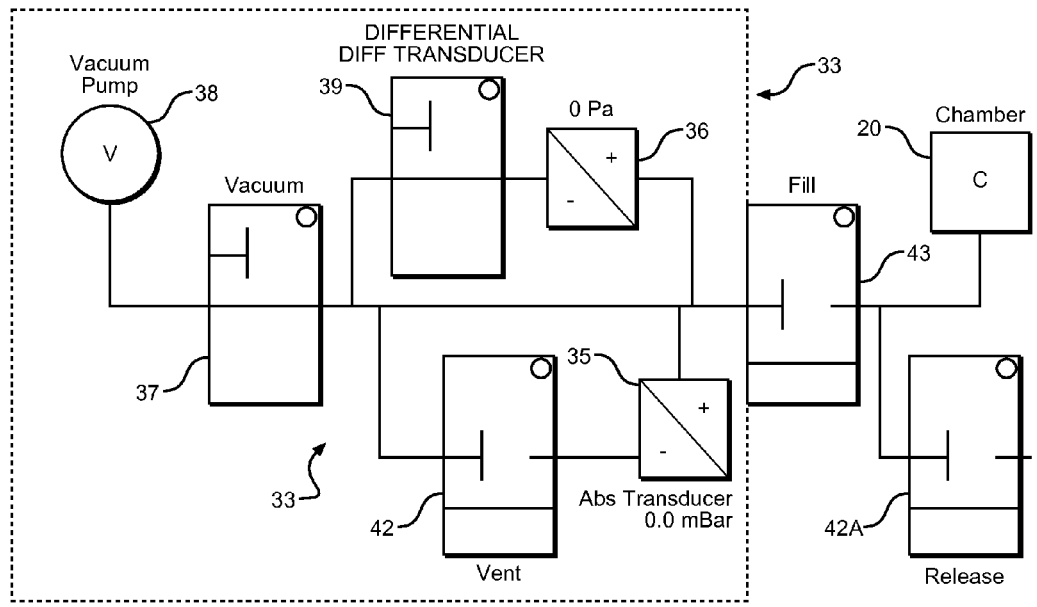
FIG. 4 is a diagram similar to FIG. 3 showing the isolation valve closed to isolate the test chamber from the testing system prior to a test.
Figure 5:
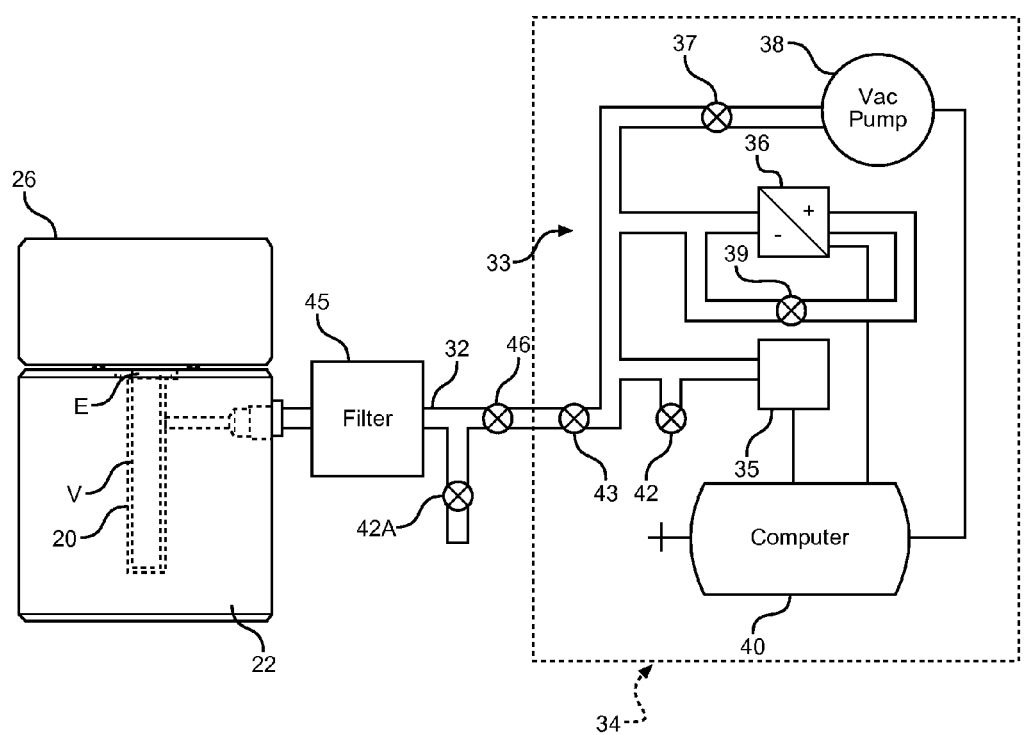
FIG. 5 is another embodiment of testing system showing a safety filter between the testing system and the test chamber.

With specific reference to FIGS. 3-5, the test system 33 within the controller 34 of a preferred embodiment includes an absolute vacuum pressure transducer 35 and a differential pressure transducer 36, both of which are in communication with the suction conduit 32 and a downstream vacuum pump 38. A first valve 37 is placed between the transducers and the vacuum pump for closing the vacuum pump from the vacuum conduit when a first test pressure, which in some tests may be approximately absolute vacuum pressure, is achieved within the test chamber following a stepped sequence as explained below. The closing of the first valve to close the test system from the vacuum pump is controlled by a microcomputer 40 in response to signals received from the absolute vacuum pressure transducer 35 that pressures within the test chamber and along the vacuum conduit are at a predetermined level within one or more predetermined time periods. Following the initial period(s), a very short time period is given to allow the system to equalize after closing a second valve 39 between the differential pressure transducer and a reference source. Thereafter, during a final test time, as measured in seconds, a differential pressure test is conducted wherein the differential pressure transducer monitors the pressure within the test chamber to determine if there is any pressure increase that would reflect a small leak in the container or vial. During the final test period, the absolute pressure transducer also monitors the pressure in the test chamber to provide confirming data.

With reference to FIG. 4, either immediately following an aborted test or the final test period or prior to or after a venting of the test chamber following an aborted test or the final test period, an isolation valve 43 closes the testing system 33 from the test chamber 20. With the vacuum pump operating, the valve 37 open and isolation valve 43 closed, an at-rest vacuum condition is established within the test system 33, which condition is maintained until a subsequent test cycle. The at-rest vacuum maintained within the testing system typically ranges between 0 to 10 mbar.

With reference to FIG. 5, in order to prevent contamination of the test equipment, a hydrophobic or other filter 45 is placed along the vacuum conduit 32. This is particularly important if a container under test has a large leak that could damage the equipment. Also, after "failed" tests, and especially after tests aborted before completion due to large leaks, following removal of the leaking packages and any disposable test chamber inserts, a flushing of the test chambers and vacuum conduits is conducted in order to remove contaminant gas and liquids from the test chambers. As further shown in FIG. 5, to protect the components of the testing system 33 of the controller from contaminants, the computer 40 controls opening and closing of an emergency shut off valve 41 and also a vent valve 42 that is provided to purge or vent the test system of the controller. The shut off valve 41 is operable upon detection of a large or gross leak in a container to thereby prevent contaminants from entering the testing system 33. In some embodiments of the invention, a separate vent valve 42A may be used after each test to vent the test chamber 20 as a container is being removed there from. In other embodiments, the test chamber is vented simply upon opening of the chamber to remove a tested container. In the embodiments of the invention shown in FIGS. 3 and 4, the isolation valve 43 is also operable by the controller in a manner of an emergency valve to close the testing system to prevent contaminants from affecting the components of the system. A separate emergency valve, such as 41 of FIG. 5 may be used in the system of FIGS. 3 and 4 intermediate the isolation valve 43 and the test chamber 20.

The absolute pressure transducer 35 is not a gauge transducer and the readings taken thereby are always true values that are not measured against or compared against atmospheric pressure. This prevents pressure readings variations due to changes in atmospheric pressure related to weather or altitude. The transducer range is preferably 0 to 1000 Torr or 0 to 1000 mbar. The controller includes a display screen 52 or other digital data monitoring system which reflects live pressure readings during each test so that an operator can observe the rate of pressure changes during a test procedure. One form of absolute transducer is an MKS 902, Piezo Transducer part number 902d-1113.

The differential pressure readings are also displayed live or are monitored using a digital monitoring system during a test so that an operator may observe the rate of pressure change start at a zero pressure change at the beginning of the final test cycle following the pressure being reduced to the final predetermined vacuum pressure. The differential transducer range is preferably 0 to 10 Torr or 0 to 1333 Pa. This higher sensitivity differential transducer allows for smaller pressure change measurements and therefore, smaller leak detection.

Figure 6:
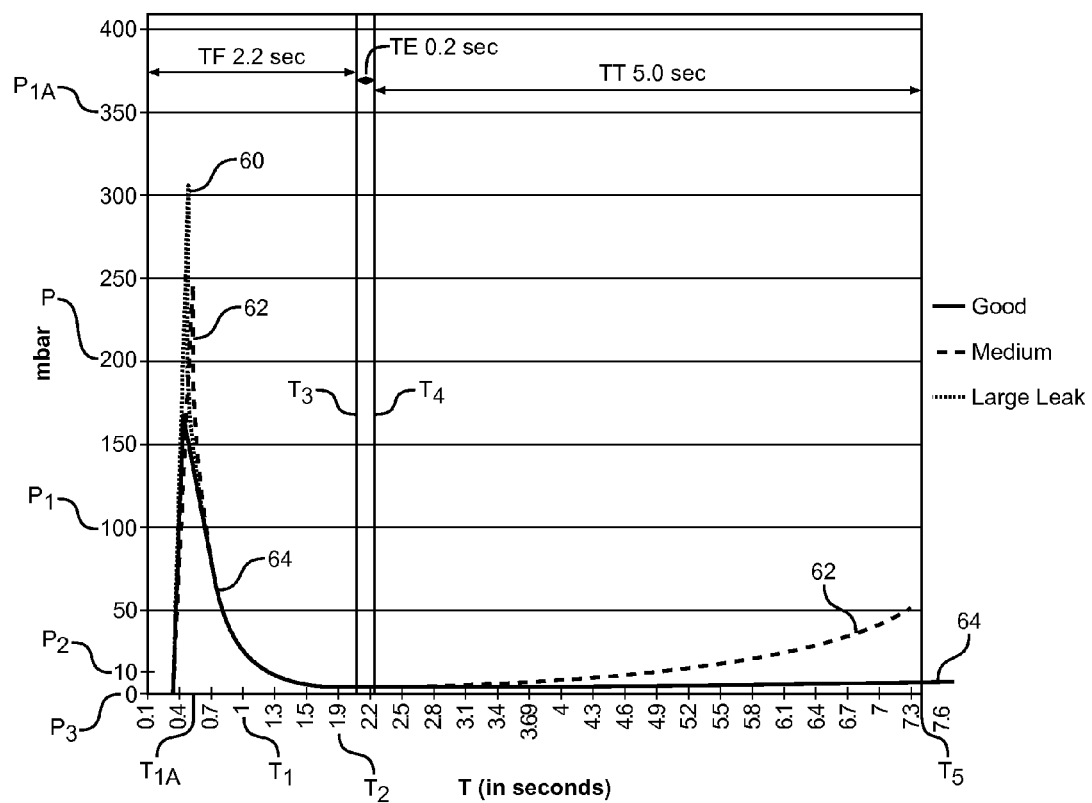
FIG. 6 is a time and pressure graph associated with the testing method of the present invention.

The testing times with respect to the invention may vary as the longer the test time the more accurate all gas leak measurements may become. On the other hand, liquid leaks must be quickly detected before vapor saturation pressure is reached within the air space of the test chamber and test system. Also, to be commercially viable, test procedures must be done as expeditiously as is possible. With reference to FIG. 6, based on numerous tests, a preferred example of a time line verses pressure for one type of test of a filled vial is reflected. The graph shows three lines that reflect the measured pressure within the test chamber 20 from a start time T1 to a second time T2 at which a first predetermined vacuum pressure P1 must be reached for three different containers or vials wherein line 60 is for a container having a gross or large leak, line 62 is for a container having a small leak and line 64 is for a container not having a leak. If the first predetermined vacuum pressure is not reached within time T1, the test is aborted as such reflects a large leak in the vial, the elastomeric closure "E" or in the seal there between. As previously described, it is also important to abort a test as soon as possible if there are large leaks or failures that could cause contamination of the test equipment. By way of example, for a liquid-filled vial, the first period may be conducted in a series of two or more stages wherein predetermined times are established for a series of pressure levels to be obtained.

At the start of the test, because the testing system 33 is under vacuum, the sensed or measured pressure within the testing system is close to absolute vacuum at 0 mbar. As the isolation valve 43 opens the testing system to the test chamber 20, the pressure within the testing system rises quickly, by way of example, within one to two seconds or less, to 150 mbar or higher depending on the condition of the container, that is, depending on whether or not a large leak exists in the container under test. As shown by way of example, when a large leak is present in the container being tested, the pressure rises initially to a vacuum of above 300 mbar and, even using a high efficiency vacuum pump, the large leak prevents the pressure in the testing system to drop to the first predetermined pressure P1 of 100 mbar by time T1 of one second, whereas a container having a small or medium leak or a one having no leak are sensed to have achieved the pressure P1 prior to time T1, and thus the tests with respect to these containers are continued whereas the test for the gross or large leak container is aborted at time T1. The pressure P1 may be set at any predetermined point and the first time may also be varied. As noted above, there may be a series of predetermined pressures and times to abort tests when sensed pressures within the test chamber do not fall to appropriate levels. By way of example, if pressure within the test chamber does not reach a level P2 of approximately 10 mbar by time T2, the test will be aborted. On the graph of FIG. 4, at a time T3 of approximately 2.2 seconds, both the container having a small or medium leak and the good container have achieved almost absolute pressure P3 of 0 mbar. At this time, liquid within the container having the small or medium leak will vaporize into the test chamber and the affects can be measured by a vacuum decay test procedure beginning at time T4 following a stabilization period of approximately 0.2 seconds between T3 and T4.

At time T3, the controller computer 40 will close the first valve 37 to the pump. After this, the valve 39 is closed and less than a second is allowed to stabilize the system before the controller computer causes the differential transducer 36 to begin sensing changes or gains in pressure within the test chamber 20 at time T4. The final testing for increasing pressure or pressure decay is taken over a period between T4 and T5 of up to approximately 5 seconds. Any pressure increase reflects the smallest detectable leaks. Thus the curve 62 curves upwardly reflecting an increase in pressure within the test chamber 20 indicating a small leak in a container whereas curve 64 shows little to no increase in pressure within the test chamber during the period from T4 to T5 and is thus reflective of a non-leaking or good container. At pressures as low as absolute pressure of 0 mbar, leaks of 1.0 micron or less may be detected accurately. The tests may be conducted at elevated pressures as well.

At time T5, or whenever a test is aborted early, the test chamber may be vented as the container is removed. Prior to this venting period, the isolation valve 43 is closed so that the test chamber 20 is not in communication with the test system. However, the valve 37 is opened to the vacuum pump such that a low vacuum is maintained within the testing system 33 until the test system is communicated with the test chamber 20 to start a new test, at which time the isolation valve 43 is opened to communicate the testing system 33 including the vacuum pump 38 with the test chamber.

One alternative approach to the start of the test method includes first isolating the evacuated testing system 33 from the vacuum pump by closing valve 37, and so keeping the sensed or measured pressure within the testing system at at-rest vacuum conditions, which by way of example, is close to absolute vacuum at 0 mbar. Upon opening the isolation valve 43, the testing system 33 is opened to the test chamber 20 and the pressure within the testing system rises quickly, by way of example, within one to two seconds or less, to 150 mbar or higher depending on the condition of the container, that is, depending on whether or not a large leak exists in the container under test. As shown by way of example, when a large leak is present in the test container, the pressure rises initially to a pressure of above 300 mbar. Because the vacuum source is isolated from the testing system at this point, the pressure quickly peaks and equilibrates, and the pressure measured or sensed is compared to a predetermined limit. If the pressure equilibrates or peaks at a value greater than a first predetermined pressure P1A, indicative of a grossly large leak, the leak test is aborted. If the pressure equilibrates or peaks at a value meeting the predetermined limit, the vacuum source 38 is opened to the testing system by way of valve 37 and the test is allowed to proceed. By way of example, a pressure peaking or equilibrating to 300 mbar is indicative of a grossly large leak, while a pressure peaking or equilibrating to 100 mbar is indicative of a container having a small or medium leak or a one having no leak, and thus the tests with respect to these containers are continued whereas the test for the gross or large leak container is aborted at time T1A. The pressure P1A may be set at any predetermined point and the first time T1A may also be varied.

It should be noted that the foregoing test times and pressures are by way of example and may vary depending on the container being tested. It is the concept of performing the tests while monitoring absolute pressures using a sequence of steps to abort tests when necessary that is important. However, it is the maintenance of an at-rest vacuum state within the testing system that is the most significant feature of the preferred embodiments of the invention.

In view of the foregoing, the present invention is directed to the field of package leak detection by means of vacuum decay leak tests. The present invention includes the addition of an at-rest vacuum state in which the test system is maintained under a constant state of vacuum between package leak tests. This at-rest vacuum condition acts to stabilize the test system, including pressure transducers, thus yielding several distinct improvements to vacuum decay leak detection. Incorporating at-rest vacuum between vacuum decay leak tests minimizes pressure transducer drift between tests, minimizes or eliminates build-up of vapors or gases within the test system, minimizes or eliminates environmental effects of temperature, humidity and altitude on test results, and shortens the time to reach test vacuum conditions. The practical advantages of adding at-rest vacuum include shorter overall test times, a more stable no-leak baseline, the elimination of calculations to adjust for environmental effects on baseline or transducer drift, and more reliable and sensitive test results. This invention offers distinct advantages to the vacuum decay leak detection of a wide variety of containers, and more particularly to the testing of containers filled with either dry product or liquid product such as non-porous vials, ampoules, injection cartridges, ophthalmic product packages, syringes, pouches, blister packages and other packages containing critical medicinal and/or chemical products. The use of at-rest vacuum applies to the testing of containers using a method of measuring vacuum decay within a test chamber in which a container being tested is sealed and wherein as a vacuum is being pulled with the test chamber the pressure levels are continuously monitored using either an absolute pressure transducer alone, or both an absolute pressure transducer and a differential pressure transducer, such that pressure conditions within the test chamber over a period of time are used to indicate passage or failure of a container being tested.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

We claim:

1. A method of testing completely or partially liquid product filled or dry product filled rigid and semi-rigid nonporous containers for leaks, including headspace gas leaks and/or vapor leaks derived from package contents, using at least one or both an absolute pressure transducer and a differential pressure transducer in a testing system that includes a vacuum source and wherein the testing system may be selectively isolated from a test chamber in which a container is received for testing, wherein the method comprises the steps of:
   A. Placing a container in an airtight test chamber and sealing the chamber;
   B. Maintaining an at rest reduced vacuum pressure within the testing system prior to communicating the testing system to the test chamber;
   C. Starting a test by connecting the testing system, while at the reduced vacuum pressure, to the test chamber and applying a reduced pressure to the test chamber utilizing the vacuum source;
   D. Closing the vacuum source from the test chamber if a predetermined pressure is reached within a predetermined time period; and subsequently
   E. Monitoring any decay in the vacuum created in the test chamber by using a differential pressure transducer to monitor any increase in pressure within the test chamber during another predetermined period of time such that increases in pressure may reflect small leaks in the container.

2. The method of testing of claim 1 wherein step C is performed such that in a first period of time, if a first predetermined pressure is not achieved, the test is aborted but, if achieved, the test to continues to step D.

3. The method of claim 2 wherein the pressure within the testing system is maintained at or below a vapor pressure of a liquid within the container when in the at rest condition of reduced vacuum pressure and the first predetermined pressure is above the vapor pressure of the liquid.

4. The method of testing of claim 2 wherein step C is performed such if the first predetermined pressure is achieved, the test continues for a second period of time and if a second predetermined pressure is not achieved, the test is aborted, otherwise the test continues to step D.

5. The method of testing of claim 1 wherein step C is performed in at least two steps, such in a first period of time, the testing system in the at-rest vacuum state is isolated from the vacuum source, then the testing system is connected to the test chamber while monitoring the pressure within the test chamber using the absolute pressure transducer and aborting the testing if a first predetermined pressure is exceeded within a first predetermined period of time from the start of the test; otherwise the test continues by opening the vacuum source to the testing system and allowing the vacuum source to reduce the pressure in the test chamber to a predetermined vacuum utilizing the vacuum source while monitoring the pressure within the test chamber using the absolute pressure transducer.

6. The method of claim 5 wherein in step C the test is aborted if a second predetermined pressure is not achieved within a second predetermined period of time, following the first period from the start of the test.

7. The method of testing of claim 1 including the additional steps of closing the testing system to the test chamber while maintaining a vacuum pressure within the testing system and venting the test chamber if the first predetermined pressure is not reached within the first predetermined period of time.

8. The method of testing of claim 7 wherein the vacuum pressure is at or below the vapor pressure of any liquid within the container.

9. The method of testing of claim 7 wherein the vacuum pressure is between 0 to 10 mbar.

10. The method of testing of claim 1 including the additional steps of closing the testing system to the test chamber while maintaining a vacuum pressure within the testing system and venting the test chamber after the monitoring of step E.

11. The method of testing of claim 10 wherein the vacuum pressure is at or below the vapor pressure of any liquid within the container.

12. The method of testing of claim 10 wherein the vacuum pressure is between 0 to 10 mbar.

13. The method of testing of claim 1 wherein prior to step E, stabilizing the test system for a short period of time to eliminate dynamic pressure conditions caused by pulling the vacuum.

14. The method of claim 1 wherein the pressure within the testing system is maintained at or below a vapor pressure of a liquid within the container when in the at rest condition of reduced vacuum pressure.

15. The method of claim 14 wherein the pressure within the testing system is maintained between 0 to approximately 10 mbar in the at rest condition.

16. A method of testing completely or partially liquid product filled or dry product-filled rigid and semi-rigid nonporous containers for leaks, including headspace gas leaks and/or vapor leaks derived from package contents, using both an absolute pressure transducer and a differential pressure transducer in a testing system that includes a vacuum source and wherein the testing system may be selectively isolated from a test chamber in which a container is received for testing, wherein the method comprises the steps of:
   A. Placing a container in an airtight test chamber and sealing the chamber;
   B. Maintaining a reduced vacuum pressure within the testing system prior to communicating the testing system to the test chamber;
   C. Starting a test by connecting the testing system, while at the vacuum pressure, to the test chamber and reducing the pressure in the test chamber to a predetermined vacuum utilizing the vacuum source while monitoring the pressure within the test chamber using the absolute pressure transducer and aborting the testing if a first predetermined pressure is not achieved within a first predetermined period of time from the start of the test;
   D. Closing the vacuum source from the test chamber if the predetermined pressure is reached within the predetermined time period;
   E. Stabilizing the test system for a short period of time to eliminate dynamic pressure conditions caused by pulling the vacuum; and subsequently
   F. Monitoring any decay in the vacuum created in the test chamber by using a differential pressure transducer to monitor any increase in pressure within the test chamber during another predetermined period of time such that increases in pressure may reflect small leaks in the container.

17. A system for leak testing rigid and semi-rigid non porous containers having either liquid or dry product sealed therein, the system comprising a test chamber for enclosing a container to be tested such that the test chamber is sealed from an ambient environment except for a port to which a testing system including a vacuum pump is connected, the vacuum pump being capable of creating a substantially absolute vacuum within the test chamber in a short period of time, an absolute pressure transducer for sensing vacuum pressure within the test chamber and conveying sensed pressures to a controller, a differential pressure transducer for monitoring increases in pressure within the test chamber after pressure within the test chamber has fallen to a predetermined pressure as sensed by the absolute pressure transducer, the controller including means for aborting a test in the event pressures within the test chamber do not reach the predetermined pressure within a predetermined time and for controlling operation of the vacuum pump, and a means of isolating the test chamber from the test system so that the testing system with pressure transducers can be maintained under an at-rest vacuum condition while leak tests are not actively in progress.

18. The system of claim 17 wherein the means for isolating includes an isolation valve controlled by the controller for closing a vacuum line connecting the testing system and the test chamber if a test is aborted or after monitoring for increase of pressure within the test chamber, and vent valve means for venting the test chamber upon closure of the isolation valve.

* * * * *